(No Model.)
T. S. HUNTINGTON.
SEWING MACHINE.
No. 276,537. Patented Apr. 24, 1883.
2 Sheets—Sheet 1.
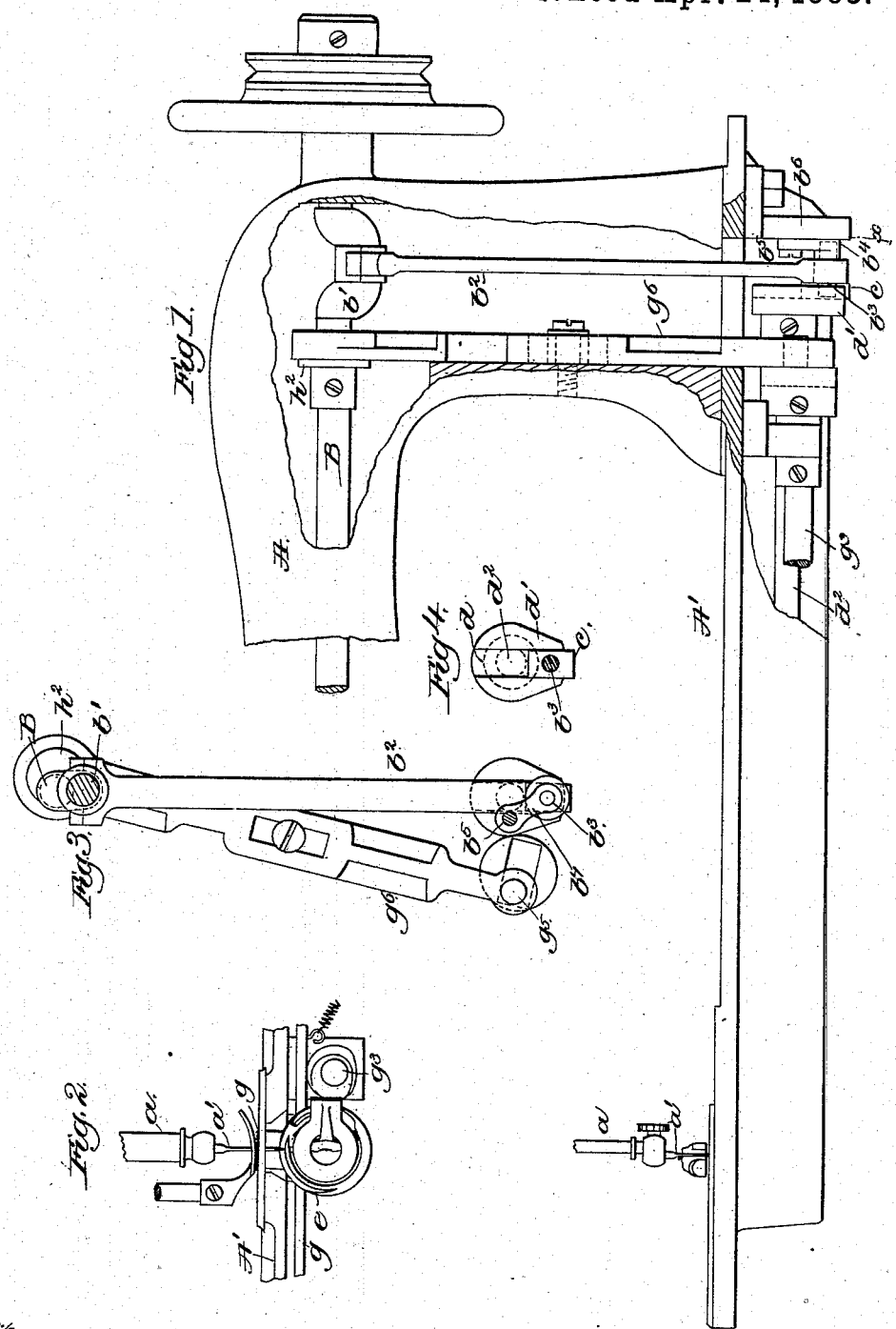
Witnesses
Fred A. Powell
John F. C. Prinkert
Inventor
Thomas S. Huntington
by Crosby & Gregory
attys

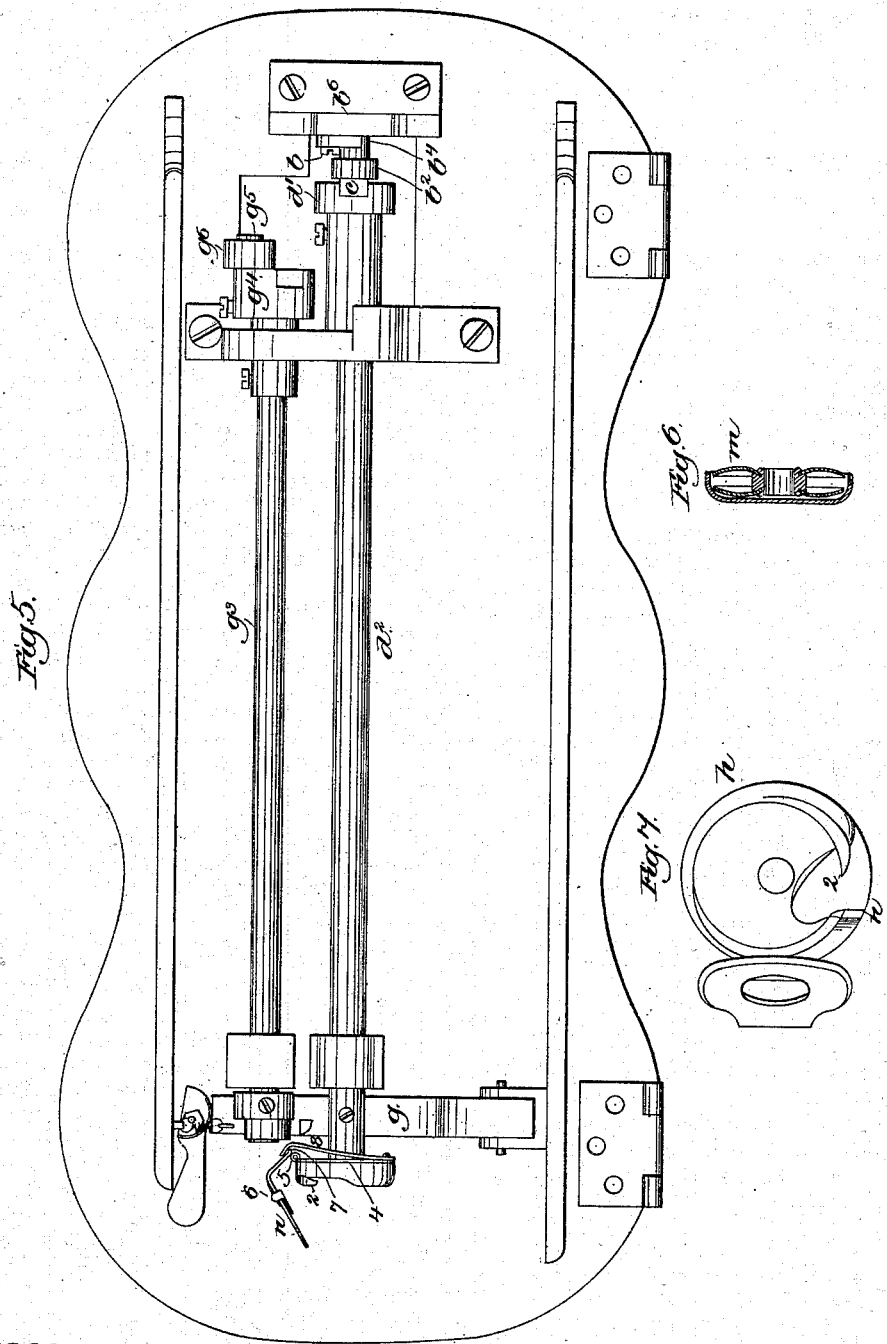

UNITED STATES PATENT OFFICE.

THOMAS S. HUNTINGTON, OF NEW YORK, N. Y., ASSIGNOR TO THE NEW HOME SEWING MACHINE COMPANY, OF ORANGE, MASSACHUSETTS.

SEWING-MACHINE.

SPECIFICATION forming part of Letters Patent No. 276,537, dated April 24, 1883.

Application filed February 26, 1883. (No model.)

*To all whom it may concern:*

Be it known that I, THOMAS S. HUNTINGTON, of the city and county and State of New York, have invented an Improvement in Sewing-Machines, of which the following description, in connection with the accompanying drawings, is a specification, like letters on the drawings representing like parts.

My invention in sewing-machines consists in a shaft having an oscillating motion, and a connected circular hook having a point to enter and spread the loop of needle-thread, combined with a disk-bobbin placed within and oscillating with the said hook, the latter casting the loop of needle-thread caught by it about the said bobbin and its thread, as will be hereinafter described; also, in a sewing-machine, an oscillating shaft and attached circular hook, and disk-bobbin placed therein, combined with a bobbin-holder attached to and oscillating with the said hook and shaft, substantially as will be hereinafter described.

Figure 1 represents, in side elevation, a sufficient portion of a sewing-machine to illustrate one embodiment of my invention, the front part of the head being broken away; Fig. 2, a view of a part of the front of the machine omitted from Fig. 1; Figs. 3 and 4, details of the connecting devices between the upper and lower shafts. Fig. 5 is an under side view of Fig. 1; Fig. 6, a detail of the disk-bobbin, and Fig. 7 a front view of the hook alone.

The arm A, bed-plate A', needle-operating shaft B, needle-bar $a$, needle $a'$, crank $b'$, connecting-rod $b^2$, pin $b^3$, radius-bar $b^4$, oscillating shaft $d^2$, its disk or arm $d'$, and block $c$, and the lever $g^6$ and shaft $g^3$, and feed $g$ are all as in application No. 85,581, filed February 19, 1883, and I lay no claim to said parts, and instead of them I may employ any other well-known mechanism by which to oscillate the shaft $d^2$ from the rotating needle-bar operating shaft B for over one hundred and eighty degrees.

The hook $h$, herein shown, is circular, and substantially such as employed in the Wheeler & Wilson sewing-machine, and commonly known as the "rotating hook;" but it differs from the said hook in having an abrupt heel, $n$, located somewhat back from the point 2, as in Fig. 7. The point 2 enters the loop of needle-thread thrown out from the needle $a'$, and oscillates far enough to elongate or draw down the said loop, spread it, and cause one-half of the loop to pass under and back of the disk-bobbin $m$, containing the under thread, when the direction of movement of the hook $h$ is reversed and the loop of the needle-thread slips from the point 2 of the hook and is drawn up about the bobbin $m$, and so as to inclose the bobbin-thread in the loop of needle-thread, making the usual lock or shuttle stitch.

The hook $h$, at its rear side, has hinged to it at 5 the bobbin-holder $n$, provided with the friction-spring 6, which bears on the disk-bobbin $m$. The holder $n$ has a projection, 7, which is acted upon by a spring, 8, attached to the back 4 of the hook $h$, the said spring, when bearing on the said projection, as in Fig. 5, retaining the holder back away from the bobbin and face of the hook, and when resting on only the end of the projection retaining the holder closed, so as to retain the bobbin in the hook. The holder is attached to and moves with the oscillating hook and the bobbin turns with them.

I claim—

1. The oscillating shaft and hook, combined with the disk-bobbin, and bobbin-holder moving with the hook and acting to hold the bobbin in place, substantially as described.

2. The circular hook and bobbin-holder pivoted to it, combined with a spring to act upon and retain the bobbin in the hook or permit its removal, substantially as shown and described.

3. The rotating needle-bar-operating shaft B, located in the arm of the machine, and the shaft $d^2$, and connecting devices to oscillate the same from the shaft B, combined with the oscillating hook $d$ and disk-bobbin, and means to retain the said bobbin in the said hook, substantially as described.

In testimony whereof I have signed my name to this specification in the presence of two subscribing witnesses.

THOS. S. HUNTINGTON.

Witnesses:
SPENCER C. DOTY,
LEWIS MACNAB.